US012732910B2

(12) United States Patent
Frenger et al.

(10) Patent No.: US 12,732,910 B2
(45) Date of Patent: Sep. 8, 2026

(54) REDUCING ENERGY CONSUMPTION AT A BASE STATION

(71) Applicant: Telefonaktiebolaget LM Ericsson (publ), Stockholm (SE)

(72) Inventors: Pål Frenger, Linkoping (SE); Jonas Bengtsson, Haljarp (SE); Mikkel Myhre, Jarfalla (SE); Peter T. Dahlqvist, Akersberga (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 298 days.

(21) Appl. No.: 18/567,513

(22) PCT Filed: Jun. 7, 2021

(86) PCT No.: PCT/EP2021/065187
§ 371 (c)(1),
(2) Date: Dec. 6, 2023

(87) PCT Pub. No.: WO2022/258139
PCT Pub. Date: Dec. 15, 2022

(65) Prior Publication Data

US 2024/0276367 A1 Aug. 15, 2024

(51) Int. Cl.
*H04W 52/02* (2009.01)
*H04W 24/08* (2009.01)
*H04W 36/08* (2009.01)

(52) U.S. Cl.
CPC ....... *H04W 52/0206* (2013.01); *H04W 24/08* (2013.01); *H04W 36/08* (2013.01)

(58) Field of Classification Search
CPC . H04W 52/0206; H04W 52/04; H04W 52/14; H04W 24/08; H04W 36/08; H04W 88/10; H04B 7/02; H04B 7/04; H04B 7/0413
See application file for complete search history.

(56) References Cited

U.S. PATENT DOCUMENTS 10,716,062 B1 * 7/2020 Kato ................ H04W 52/0206
12,369,121 B2 * 7/2025 Selvaganapathy .... H04W 68/02
2014/0349587 A1 11/2014 Frenger
2016/0174280 A1 * 6/2016 Singh .................... H04W 76/15 370/329
2017/0118655 A1 * 4/2017 Blosco .................. H04W 16/28
2017/0156068 A1 6/2017 Frenger
2020/0288392 A1 * 9/2020 Rao ....................... H04W 48/12
2022/0295406 A1 * 9/2022 Ishikura ................ H04W 52/02

FOREIGN PATENT DOCUMENTS

WO WO 2015/103772 A1 7/2015

OTHER PUBLICATIONS

"IMT-2020 self-evaluation: Radio Network Energy Performance—LTE", 3GPP TSG-RAN WG1 Meeting #94, Aug. 20-24, 2018, R1-1809273, XP051516637, Gothenburg, Sweden.

* cited by examiner

*Primary Examiner* — Mohamed A Kamara
(74) *Attorney, Agent, or Firm* — FBT Gibbons LLP

(57) ABSTRACT

A method for reducing energy consumption for a base station providing multiple-input multiple-output, MIMO, communication on a mixed-mode carrier supporting at least two RATs is provided by determining sleep mode independently for the at least two RATs and performing port merging for at least one of the two RATs based on the determined sleep modes. An apparatus implementing the method is also disclosed.

20 Claims, 7 Drawing Sheets

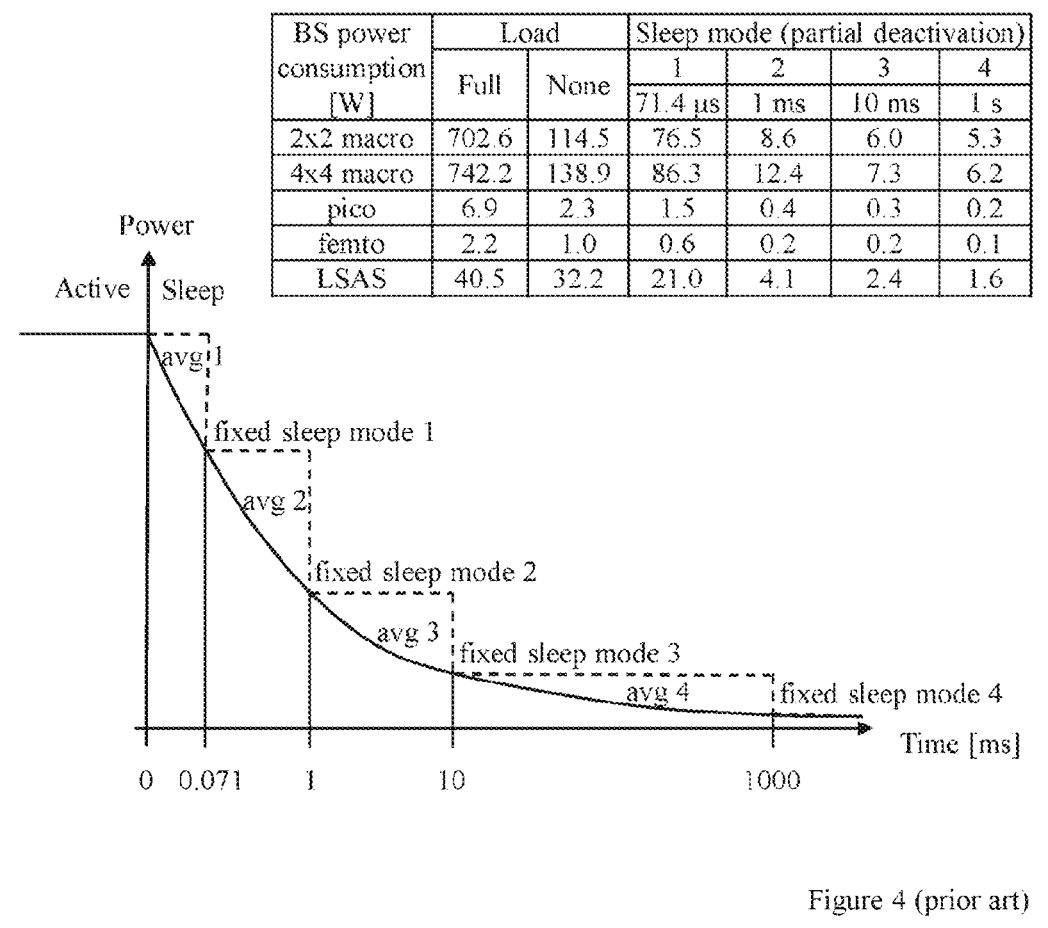

| BS power consumption [W] | Load | | Sleep mode (partial deactivation) | | | |
|---|---|---|---|---|---|---|
| | Full | None | 1 | 2 | 3 | 4 |
| | | | 71.4 µs | 1 ms | 10 ms | 1 s |
| 2x2 macro | 702.6 | 114.5 | 76.5 | 8.6 | 6.0 | 5.3 |
| 4x4 macro | 742.2 | 138.9 | 86.3 | 12.4 | 7.3 | 6.2 |
| pico | 6.9 | 2.3 | 1.5 | 0.4 | 0.3 | 0.2 |
| femto | 2.2 | 1.0 | 0.6 | 0.2 | 0.2 | 0.1 |
| LSAS | 40.5 | 32.2 | 21.0 | 4.1 | 2.4 | 1.6 |

Figure 4 (prior art)

REDUCING ENERGY CONSUMPTION AT A BASE STATION

CROSS REFERENCE TO RELATED DATA

This application is a national-phase entry under 35 USC § 371 of International Application No. PCT/EP2021/065187, filed Jun. 7, 2021, titled "Reducing Energy Consumption at a Base Station," the contents of which are hereby incorporated herein in its entirety.

TECHNICAL FIELD

The present disclosure relates to a method for reducing energy consumption and a device for reducing energy consumption, corresponding computer program and computer program product.

BACKGROUND

The growth in data traffic has led to energy consumption in radio networks becoming a significant contributor to the electricity usage and operational expenditures of operators. Major part of energy consumption in mobile networks comes from a radio base station site. One way to reduce radio base station power consumption is to enable a feature known as multiple-input multiple-output, MIMO, sleep mode, wherein the number of active antennas is reduced when traffic is low.

One variant of the MIMO sleep mode, denoted MIMO port muting, consists in deactivating some antenna ports so that radio signals are not transmitted from them to a user equipment, UE. This is simple to implement but results in performance degradation. From the UE perspective it looks as if the radio channel is fading 100% of the time on the muted ports. In another variant of the MIMO sleep mode, denoted MIMO port merging, signals from each antenna port are merged and delivered to one antenna branch. When antenna ports are merged, the UE still receives all signals, but from the UE perspective it looks like the antenna ports are perfectly correlated 100% of the time. Examples of port muting and port merging in case of 4 physical antennas and 4 antenna ports are shown in FIGS. 1*a* and 1*b*, respectively.

Different Radio Access Technologies, RATs, such as Long-Term Evolution, LTE, 5G New Radio, NR, and Narrowband Internet of Things, NB-IoT, may support different MIMO sleep modes. Reducing power consumption in a radio base station by utilizing different sleep mode levels is a known and effective method in prior art. For the purpose of describing the present disclosure disclosed here we will refer to the sleep modes defined in Debaillie, et al., *A Flexible and Future-Proof Power Model for Cellular Base Stations*, In Proc. IEEE Vehicular Tech. Conf. Spring 2015, Glasgow; Scotland, May 2015. The hardware components in a radio base station all have different properties in terms of energy savings when deactivated and in terms of reactivation time. Components with compatible reactivation times can be grouped and deactivated or reactivated together. Such a component grouping is referred to a sleep mode. In Debaille et al., four different sleep modes (1, 2, 3, and 4) are defined and in the description of this present disclosure we will reuse the same terminology. Hence the following different sleep modes will be used (note that these sleep modes are introduced here for example purposes only):

- Sleep mode 1: very fast reactivation time measured in micro-seconds, no performance impact, few components on the transmit path can be put to sleep, limited power saving. Often, only analog components in the radio (like power amplifiers) can be reactivated on this fast time scale in radio products.
- Sleep mode 2 or 3: reactivation time measured in milli-seconds, limited performance impact in terms of some additional latency, more components can be put to sleep (e.g. including digital parts of the radio hardware), larger power saving. Sleep modes 2 and 3 are very similar and the main difference between them is that sleep mode 2 has a reactivation time of 1 ms and sleep mode 3 has a reactivation time of 10 ms. Due to the similarities of these two modes, they may be considered equal in the context of this present disclosure.
- Sleep mode 4: reactivation time measured in seconds or minutes, very large performance impact, almost all components can be put to sleep, very large power saving.

FIG. 4 shows power consumption in sleep states, i.e. sleep mode 1, 2, 3, and 4 for different base station types used by 3GPP when designing the ultra-lean physical layer in NR.

There is at least one sleep mode that one RAT (e.g. NR) can use (i.e. sleep mode 2) that cannot be used by another RAT (e.g. LTE).

When energy efficiency is concerned, the difference between LTE and NR is the maximum sleep ratio that the standard supports as well as the maximum sleep duration.

The ultra-lean physical layer design of NR was motivated by the technology potential of sleep modes with re-activation time in the order of 1 ms. Since LTE requires that reference signals are transmitted approximately every 0.2 ms, only extremely fast sleep mode (i.e., sleep mode 1) is possible.

NR supports sleep durations of up to 20 ms in stand-alone mode and up to 160 ms in non-standalone mode. A sleep duration close to 20 ms (assuming an NR configuration with one single Synchronization Signal Block, SSB) allows to spend close to 19 ms in a deeper sleep mode than sleep mode 1 (i.e., sleep mode 2) that consumes very low power and that requires 1 ms to wake up from. Additional sleep modes with longer reactivation times allows for even more components to be deactivated (e.g., sleep mode 3, sleep mode 4).

SUMMARY

An object of the present disclosure is to enable a reduction of energy consumption for multiple-input multiple-output, MIMO, communication on a mixed-mode carrier.

To achieve said object, according to a first aspect of the present disclosure there is provided a method for reducing energy consumption for a base station providing multiple-input multiple-output, MIMO, communication on a mixed-mode carrier supporting at least two radio access technologies, RATs. The method of this first aspect comprises determining sleep mode independently for the at least two RATs; and performing port merging for at least one of the two RATs based on the determined sleep modes.

According to a second aspect of the present disclosure there is provided a device for reducing energy consumption for a base station providing multiple-input multiple-output, MIMO, communication on a mixed-mode carrier supporting at least two radio access technologies, RATs. The device comprising a processor and a memory, the memory having stored thereon instructions executable by the processor. The instructions, when executed by the processor, cause the device to determine sleep mode independently for the at least two RATs; and to perform port merging for at least one of the two RATs based on the determined sleep modes.

According to a third aspect of the present disclosure there is provided a computer program comprising instructions which, when run in a processing unit on a device, cause the device to determine sleep mode independently for the at least two RATs; and to perform port merging for at least one of the two RATs based on the determined sleep modes.

According to a fourth aspect of the present disclosure there is provided a computer program product comprising a computer readable storage medium on which a computer program, as mentioned above, is stored.

In an embodiment the method may comprise merging two or more antenna ports of the first RAT based on the determined first sleep mode: merging the first RAT merged antenna ports with ports of other of said at least two RATs: putting one or more components in one or more transmitter chains supporting the merged antenna ports in a power saving state.

In an embodiment, at least some ports of the other of said at least two RATs are merged.

In an embodiment, the method may comprise performing a handover or cell reselection of UEs from a RAT with lower energy efficiency to a RAT with higher energy efficiency before merging two or more antenna ports of the RAT with lower energy efficiency.

In an embodiment, the method may comprise determining sleep mode is based on one or more of: user throughput, number of connected UEs, number of utilized physical resource blocks or RAT supported by UEs.

In an embodiment, the RAT is a 3GPP RAT.

In an alternative embodiment, the first RAT is 3GPP LTE and the second RAT is 3GPP NR.

In an alternative embodiment, the first RAT is 3GPP LTE and the second RAT is 3GPP NB-IoT.

In an alternative embodiment, the first RAT is 3GPP NR and the second RAT is 3GPP NB-IoT.

In an embodiment, the merging is an antenna mapping matrix operation.

In an embodiment, the antenna mapping matrix operation indicates two or more signals of antenna ports to add and one or more antenna branches to deactivate.

In an embodiment, the operation of merging is performed in a baseband unit.

In an embodiment, the method may comprise putting one or more components in one or more transmitter chains supporting the merged antenna ports in a power saving state and adding signals of antenna ports is performed in an antenna unit.

In an embodiment, the method may comprise monitoring resource utilization of a RAT; activating a sleep mode for the RAT if a metric based on the resource utilization of the RAT is a value below a first threshold: deactivating the sleep mode for the RAT if the metric based on the resource utilization of the RAT is a value above a second threshold.

In embodiments of the device for reducing energy consumption for a base station providing multiple-input multiple-output, MIMO, communication on a mixed-mode carrier supporting at least two radio access technologies, RATs, the device is operative to carry out the embodiments of the method described above.

BRIEF DESCRIPTION OF THE DRAWINGS

For better understanding of the present disclosure, and to show more readily how the invention may be put into effect, reference will now be made, by way of example, to the following drawings, in which:

FIG. 4 shows power consumption for different sleep states according to prior art;

DETAILED DESCRIPTION

Embodiments will be illustrated herein with reference to the accompanying drawings. These embodiments are provided by way of example so that this disclosure will be thorough and complete, and will fully convey the scope of the inventive concepts to those skilled in the art.

In wireless communications networks a mixed-mode operation allows different subcarrier spacings to simultaneously coexist within the same frequency band. At a transmitting node, two or more multicarrier signals are generated, each being composed of one or more symbols, wherein the multicarrier signals have different transmission parameters, or numerologies, e.g., with respect to subcarrier spacing and/or symbol duration.

The mixed-mode operation allows two or more Radio Access Technologies, RATs, to operate on a same radio access network, RAN, equipment. Moreover, the mixed-mode operation allows the introduction of 5G on existing 4G bands without reassignment of certain frequencies from LTE to NR or a purchase of additional frequency spectrum.

To reduce energy consumption for multiple-input multiple-output, MIMO, communication on a mixed-mode carrier by using MIMO sleep mode, state of the art solutions require the MIMO sleep mode to be deactivated. The present disclosure allows for MIMO sleep mode to still be active in case of mixed-mode carrier, resulting in lower energy consumption.

In the present document, the term “antenna port” or “logical antenna port” refers to a signal visible to a user equipment, UE as defined in 3GPP standard. The UE does not have to actually “see” the antenna port (as in case of line-of-sight), but it does receive (i.e. “see”) the signals transmitted from an antenna port. A reference signal defines an antenna port. Physical downlink control and data channels are transmitted in a known relation to reference signals (antenna ports). There may be a one-to-one relation between reference signals and data/control channels, i.e. data and control channels are mapped to antenna ports exactly in the same way as the reference signals. Data/control channels may also be mapped to physical antennas by using a linear combination (precoding).

The term “antenna branch” or “physical antenna branch” refers to hardware involved in the transmission of the signals related to one antenna port. An antenna branch includes power amplifiers, filters, any digital processing that is used to process the antenna port, and a physical antenna itself.

There is no strict mapping between antenna ports and antenna branches and/or physical antennas. Antenna ports are typically processed in different antenna branches and transmitted from different physical antennas. A UE receiving a reference signal from a radio access node will, by definition, perceive the reference signal as originating from a single antenna port regardless of the setup of the physical part of the antenna port performing the downlink transmission of the reference signal.

Figure 3A:
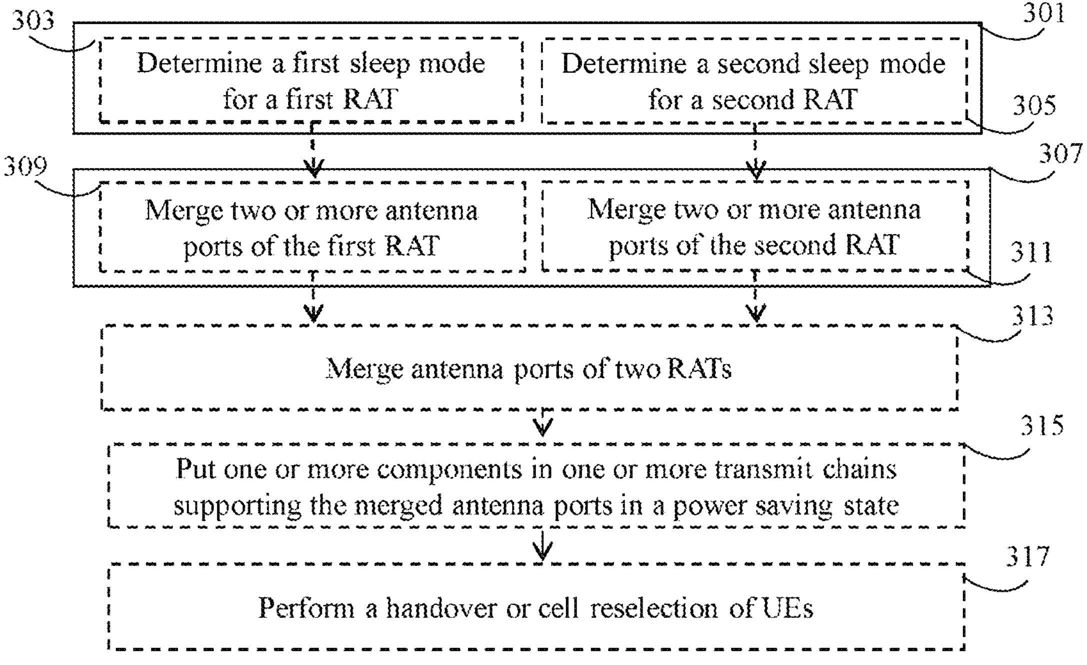
FIG. 3*a* shows a flowchart illustrating a method performed by a device according to embodiments.

With reference to FIG. 3*a*, one embodiment of a method for reducing energy consumption of a base station providing multiple-input multiple-output, MIMO, communication is disclosed. The base station operates MIMO communication on a mixed-mode carrier supporting at least two radio access technologies, RATs. In this embodiment the method comprises determining 301, 303, 305 sleep mode independently for at least two RATs and performing 309, 307, 311 port merging for at least one of the two RATs based on the determined sleep mode or modes.

The determination 301, 303, 305 of the sleep mode for a RAT is done separately from the determination of the sleep mode for other RATs. As a result of the determination 301, 303, 305 of the sleep mode for the at least two RATs in an independent way, it may be that only one of the at least two RATs should go into sleep mode, or both of the at least two RATs should go into sleep mode.

In one embodiment the port merging operation for a RAT may be done separately from the port merging operation of other RATs, e.g. in case of two RATs such as LTE and NR, port merging for LTE is done without taking into account port merging of NR and port merging for NR is done without taking into account port merging of LTE.

The term "(MIMO) sleep mode" or "sleep state" refers to a feature wherein the number of active antenna branches is reduced when traffic is low. Different MIMO sleep modes (e.g., sleep modes 1, 2, 3, and 4) are associated with different properties as explained in the Background section. Sleep modes relate to individual components within an antenna branch and not to the whole antenna branch. If a cell is in a sleep state, it means that hardware components, such as physical antennas and other components in a transmitter chain in a base station may have been deactivated. By increasing the number of components being deactivated, the cell enters deeper sleep states. If all components are deactivated/switched-off (e.g. sleep mode 4), then the cell is effectively turned off. Note that due to similarities of modes 2 and 3, they may be considered equal in the context of this document.

As mentioned earlier, in a multi-RAT mixed-mode carrier, a base station supports a transmission of more than one RAT carrier, e.g. LTE, NB-IoT and NR, on the same spectrum. Note that LTE and NB-IoT are not different RATs, but rather NB-IoT is part of the LTE standard. However, NB-IoT has system information, synchronization signals, control channels, data channels, reference signals, like a stand-alone RAT and it is possible to put NB-IoT on a carrier that does not even have LTE. Therefore, NB-IoT is treated as a separate RAT in the present document.

Figure 2:
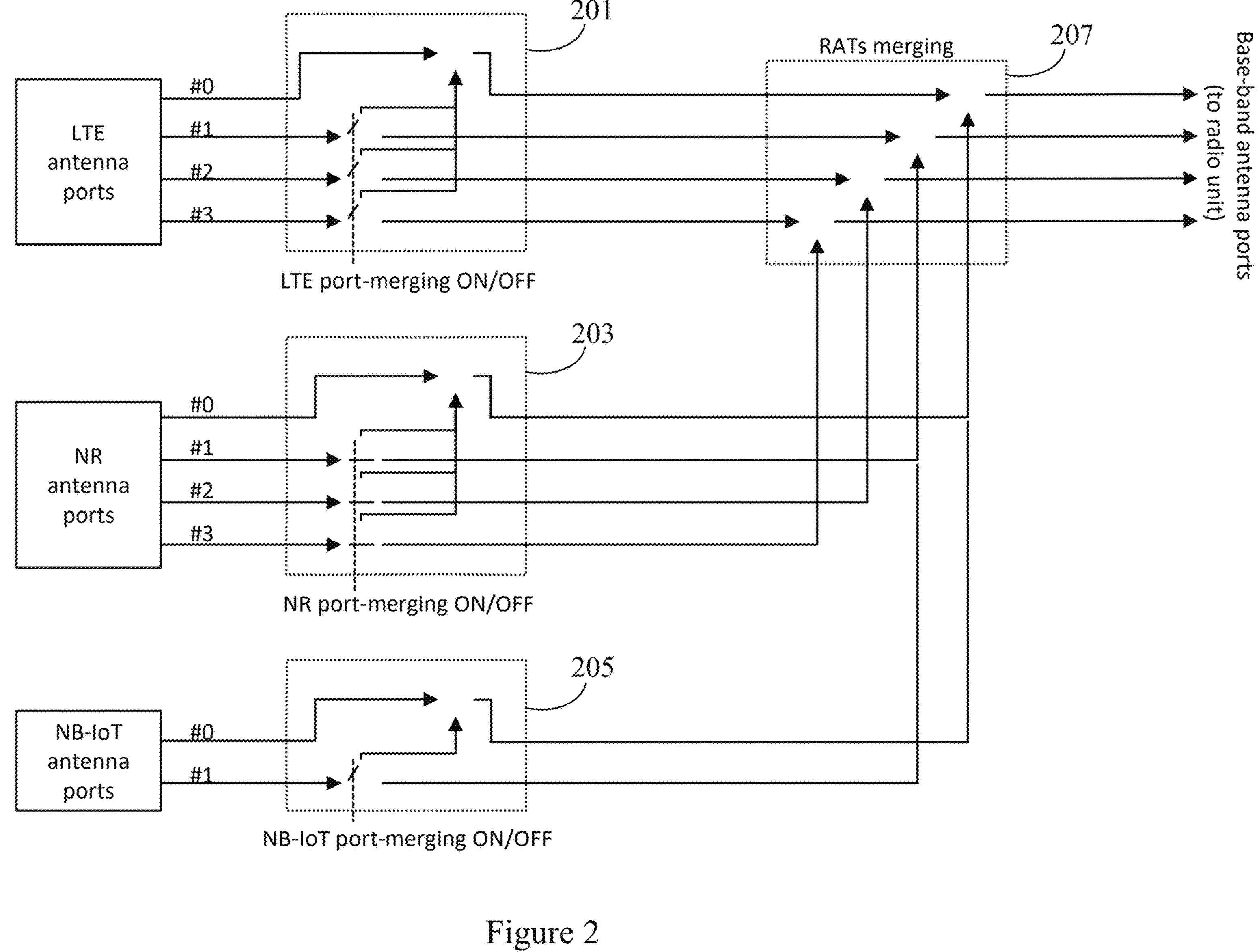
FIG. 2 shows an example of antenna port merging according to embodiments.

FIG. 2 shows an example of port merging operation on a multi-RAT mixed-mode carrier according to embodiments herein. The three RATs in FIG. 2 are LTE, NB-IoT, and NR. LTE uses four downlink antenna ports #0, #1, #2, #3, NR uses four downlink antenna ports #0, #1, #2, #3, and NB-IoT uses two downlink antenna ports #0, #1, wherein each antenna port in a preferred embodiment is associated with a physical antenna port including at least one power amplifier. The antenna port numbering here (#0, #1, #2, and #3) refer to the signals that during normal MIMO operation would be individually processed by different physical antenna branches and transmitted through different physical antennas.

Antenna port merging, indicated as LTE/NR/NB-IoT port merging ON/OFF in FIG. 2, is done for each RAT (separately) 201, 203, 205 before the antenna ports for each RAT are combined (merged) into a multi-RAT ports 207, indicated as RATs merging in FIG. 2. Referring to FIG. 2, after the LTE antenna ports (#0, #1, #2, and #3) are merged 201, LTE antenna ports #1, #2, #3 are empty, and after the NB-IoT antenna ports (#0 and #1) are merged 203, NB-IoT antenna port #1 is empty. NR antenna ports (#0, #1, #2, and #3) are not merged 205 in this example embodiment since NR is already an ultra-lean standard where antenna ports are very close to being empty when there are no data transmissions. Then, the LTE merged antenna ports are merged with the NR and the NB-IoT merged antenna ports in the RATs merging operation 207. The output of the RATs merging 207 is used to transmit the combined signals from the active antenna branches. The merged antenna ports are mapped to the physical antenna branches for transmission in a 1-to-1 fashion (i.e. antenna port #0) is transmitted on antenna branch #0, antenna port #1 is transmitted on antenna branch #1, antenna port #2 is transmitted on antenna branch #2, antenna port #3 is transmitted on antenna branch #3).

FIG. 3*a* shows a method for reducing energy consumption for a base station providing MIMO communication on a mixed-mode carrier supporting at least two RATs. In one embodiment, the method may be carried out by a device 600.

Referring to the method of FIG. 3*a*, in step 301, the method comprises determining 301, 303, 305 a sleep mode independently for the at least two RATs. There are different ways to determine 301 a sleep mode. One way is to define a metric by combining performance management, PM, measurements that relate to traffic load on each of the at least two RATs for a cell. For example, a number of connected users, X, and a physical resource block, PRB, utilization, Y, can be combined to a metric Z as Z=alpha*X+beta*Y, wherein alpha and beta are combination weights that may be tuned. Then, if Z is below a first threshold, one of the at least two RATs in the cell may be put into a MIMO sleep mode (the MIMO sleep mode is activated) 321; if Z raises above a second threshold the cell exits the MIMO sleep mode (the MIMO sleep mode is deactivated) 323, wherein the second threshold is a value higher than the first threshold. Note that if a cell is completely turned off, then it is not possible to monitor PM measurements on that cell and other mechanisms need to be used to activate the cell when needed. This can be done, for example, by using timers, traffic prediction algorithms, or monitoring load in another cell with a similar coverage area that is still active. According to an embodiment, a sleep mode may be determined based on one or more of: user throughput, number of UEs connected to the RAT, number of utilized physical resource blocks, PRBs, or RATs supported by UEs, etc.

In steps 309, 307, 311, the method comprises performing a port merging operation for at least one of the at least two RATs based on the determined sleep mode.

In an optional step, the method comprises determining 303 a first sleep mode for a first RAT. Optionally, the method comprises determining 305 a second sleep mode for a second RAT. In this embodiment the two RATs may be in two different sleep modes. The method comprises merging 309 two or more antenna ports of the first RAT based on the determined first sleep mode. Optionally, the method comprises merging 309 two or more antenna ports of the second RAT based on the determined second sleep mode.

In step 313, the method may comprise merging 313 the first RAT merged antenna ports with ports of the other of said at least two RATs, wherein the ports of the other of said at least two RATs have not been merged.

In an alternative embodiment, the first RAT merged antenna ports may be merged with the second RAT merged antenna ports.

In an optional step, the method comprises putting 315 one or more components in one or more transmitter chains supporting the merged antenna ports in a power saving state, wherein a transmitter chain comprises components used for transmitting a signal. In the power saving state, one or more components of the base station may be deactivated or put in stand-by. The higher the number of components in a power saving state (or even deactivated), the lower the total power consumption.

In an optional step 317, the method comprises performing 317 a handover or cell reselection of UEs from a RAT with lower energy efficiency to a RAT with higher energy efficiency before merging two or more antenna ports of the RAT with lower energy efficiency.

According to embodiments, a RAT may be a 3GPP RAT, such as LTE, NB-IoT and NR. Different options are possible for the at least two RATs: in one embodiment the first RAT may be LTE and the second RAT NR: in an alternative embodiment the first RAT may be LTE and the second RAT NB-IoT: in an alternative embodiment, the first RAT may be NR and the second RAT NB-IoT: in yet another alternative embodiment with three RATs, the first RAT may be NR, the second RAT NB-IoT, and the third RAT may be LTE.

Figures 1A, 1B:
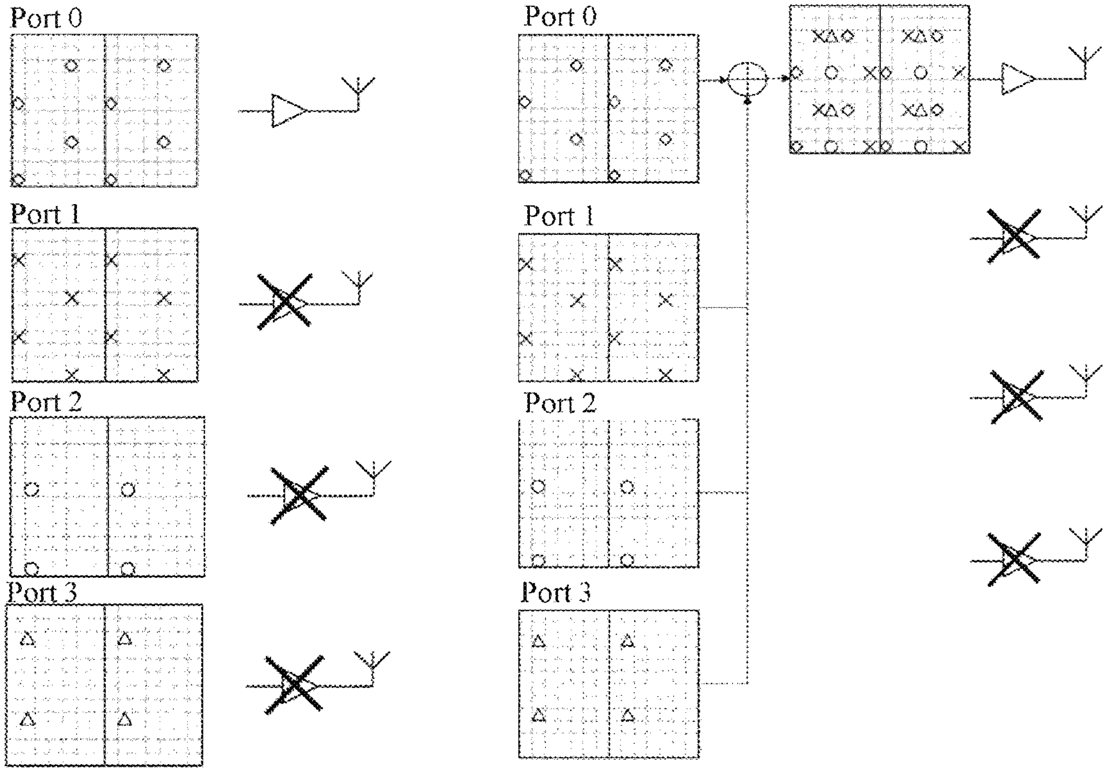
FIG. 1*a* shows an example of logical and physical antenna port muting according to prior art.
FIG. 1*b* shows an example of logical antenna port merging and physical antenna port muting according to prior art.

According to an embodiment, the merging operation 307, 309, 311, 313 is an antenna mapping matrix operation. In an antenna mapping matrix, a row corresponds to a physical antenna while a column corresponds to a logical antenna port, or transmission layer, e.g. in case of four physical antenna branches and four logical antenna ports, the antenna mapping matrix may be [1,0,0,0: 0,1,0,0: 0,0,1,0: 0,0,0,1] if there is a one-to-one mapping between physical antenna branches and logical antenna ports. A prior art antenna port muting operation is disclosed in FIG. 1*a*. The antenna port muting operation disclosed in FIG. 1*a* corresponds to an antenna mapping matrix [1,0,0,0: 0,0,0,0: 0,0,0,0: 0,0,0,0], wherein three antenna ports, Port1-Port3, have been muted. Resource elements on the muted antenna ports are not transmitted and the hardware components on the three corresponding physical antenna branches 1, 2, 3 can be deactivated. FIG. 1*b* discloses a simplified port merging operation prior to performing physical antenna branch deactivation. In the disclosed port merging operation, resource elements on four logical antenna ports. Port0-Port3, are merged by a merging operation preceding the physical antenna branch deactivation. The port merging operation disclosed in FIG. 1*b* corresponds to an antenna mapping matrix [1.1.1.1: 0,0,0,0: 0,0,0,0: 0,0,0,0]. The resource elements on each logical antenna port. Port0-Port3, are merged to a common antenna port. Port 0. When the port merging operation has been concluded, the remaining antenna ports, Port1-Port3, are empty, and there is no signal to transmit on the physical antenna branches 1, 2, 3, therefore the hardware components on the physical antenna branches can be deactivated.

Therefore, according to an embodiment, the antenna mapping matrix operation indicates two or more signals of antenna ports to add and one or more physical antenna branches to deactivate.

According to an embodiment, putting 315 one or more components in one or more transmitter chains supporting the merged antenna ports in a power saving state and adding signals of antenna ports is performed in an antenna unit or a radio unit. The operation of merging 307, 309, 311, 313 is performed in a baseband unit.

Figure 3B:
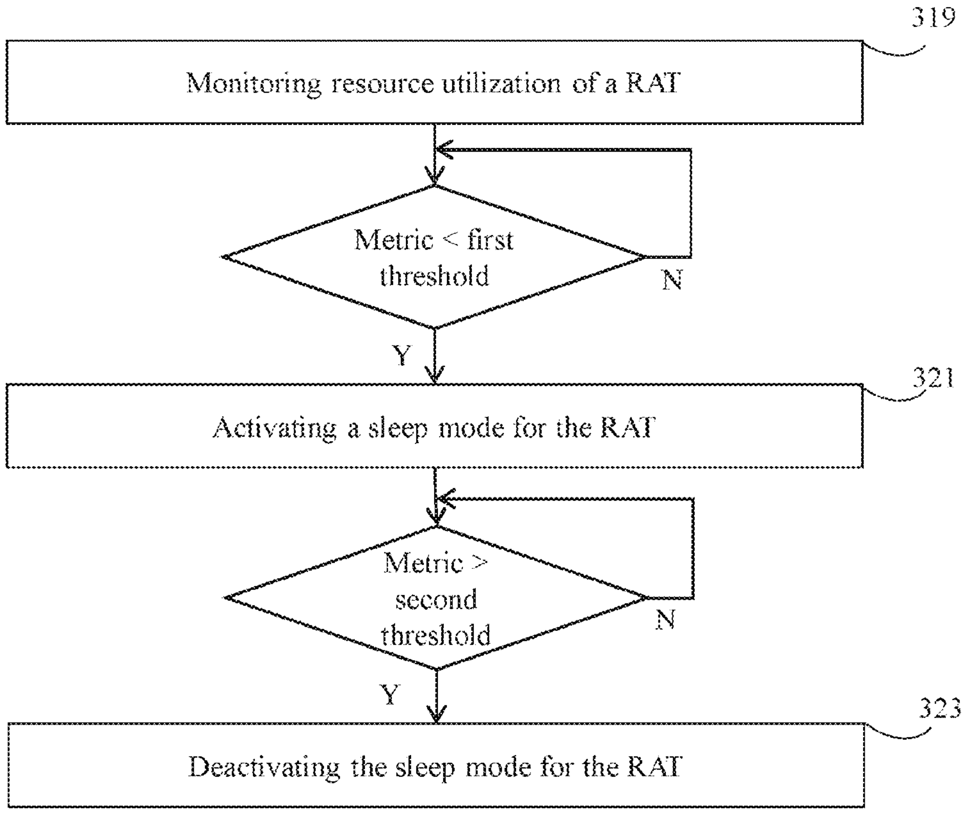
FIG. 3*b* shows a flowchart illustrating a method performed by a device according to embodiments.

FIG. 3*b* shows optional steps to determine 301, 303, 305 a sleep mode independently for the at least two RATs. The method may comprise monitoring 319 resource utilization of a RAT.

A metric based on the resource utilization of the RAT may be evaluated. If the metric is a value below a first threshold, a sleep mode for the RAT is activated; if the metric is a value above a second threshold, a previously activated sleep mode is deactivated.

Figure 5A:
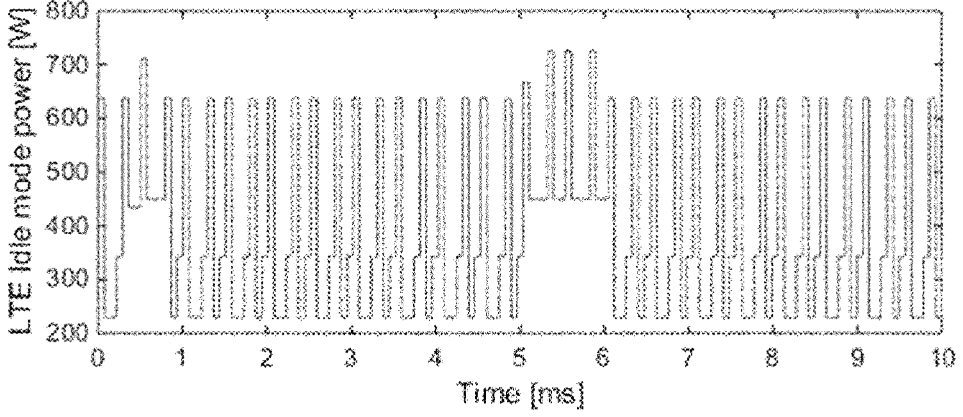
FIG. 5*a* shows an example instantaneous power consumption according to prior art.
Figure 5B:
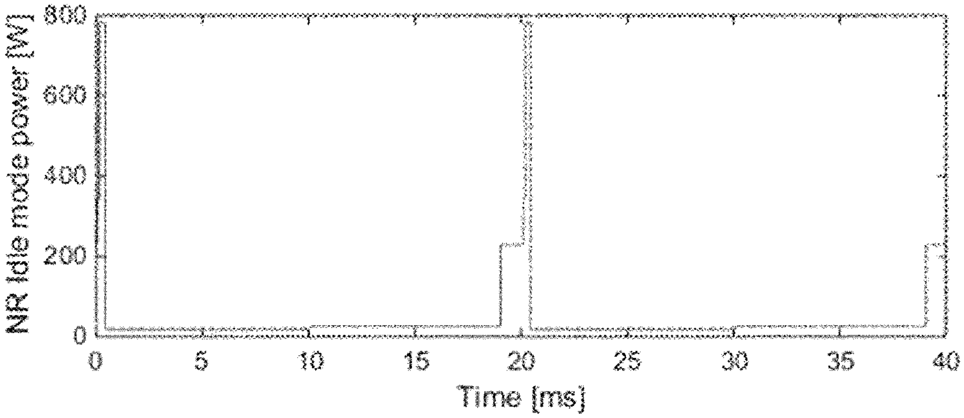
FIG. 5*b* shows a further example of instantaneous power consumption according to prior art.

FIG. 5*a* and FIG. 5*b* show instantaneous power consumption of a 3-sector LTE macro-base station with 2×2 MIMO and instantaneous power consumption for NR with one Synchronization Signal Block, SSB, configuration, 20 ms SSB periodicity using the power model "macro 2×2", respectively. With reference to FIGS. 5*a* and 5*b*, the NR base station can enter both sleep mode 3 (with an activation delay of 10 ms) and sleep mode 2 (with a 1 ms activation delay). The peak power consumption is higher for NR than for LTE (approximately 785 W in FIG. 5*b*) but the average power is significantly lower (approximately 45 W) due to the long sleep modes that are accessible for NR.

An analysis on the impact of switching between normal mode and MIMO sleep mode for LTE, NB-IoT, and NR on channel estimation and energy saving is presented in the following.

In case of LTE, the switching of MIMO sleep mode has a negative impact on channel estimation for CRS-based Transmission Modes, TM, (e.g., TM4), since the LTE link throughput drops to near 0 bps for approximately 150 ms. Where CRS stands for Cell Specific Reference Signal. This is caused by a corrupt channel estimates of the UE that constantly tries to estimate the channel using the CRS, but it is unable to receive PDCCH/PDSCH for approximately 150 ms after the switch. Other LTE transmission modes, like TM10, use Demodulation Reference Signal, DMRS-based channel estimates that does not suffer in the same way. Since the DMRS are transmitted at the same time as the downlink control and data channels (PDCCH and PDSCH, respectively) the UE has to perform a one-show channel estimation when the transmission occurs. In this case, the switching MIMO sleep mode has a neutral impact. The energy reduction gains are good, i.e. 10-20%, for MIMO sleep mode 1, and significant, i.e. 20-75%, for MIMO sleep modes 2-3.

In case of NB-IoT, MIMO sleep mode is very effective in terms of reducing base station power consumption. The energy reduction gains are good, i.e. 10%, for MIMO sleep mode 1, and significant, i.e. 20-55%, for MIMO sleep modes 2-3. Instead, the switching of MIMO sleep mode has a neutral impact on channel estimation.

Sleep mode 4 has larger or the same energy saving gain as sleep mode 2-3. But the reactivation time is longer which means that the negative performance impact also lasts longer in case the traffic increases suddenly while the base station is operating in sleep mode 4 on some of the antenna branches.

Often NR is characterized as an "ultra-lean" standard with much less mandatory and always on transmissions compared to earlier 3GPP standards. The NR standard supports up to 160 ms in-between mandatory transmissions in non-standalone, NSA, operation and up to 20 ms in standalone, SA, operation. Due to the ultra-lean design, there is no significant energy saving gain with MIMO sleep mode in NR when the hardware is only utilizing a sleep mode 1, i.e. the energy saving is below 1%. For MIMO sleep mode to be effective in NR, i.e. to achieve 20-75% gains, a deeper sleep mode than sleep mode 1 should be used, such as sleep mode 2 or sleep mode 4.

The energy reduction figures are obtained by measurements of an actual product.

NR, LTE, and NB-IoT can be all transmitted on the same carrier, wherein a carrier is a waveform that is modulated with an information-bearing signal. However, since NR, LTE, and NB-IoT react differently under MIMO sleep mode it is not efficient to use the same MIMO sleep mode on all RATs on a mixed-mode carrier. Table 1 shows recommendations for different RATs, i.e. LTE, NR, and NB-IoT, on when to enable MIMO sleep mode during low traffic in order to enable different levels of component sleep. In particular, critical machine type communication, cMTC traffic, is taken into account for sleep mode 2, and anchor carrier and booster carrier are taken into account for sleep mode 4. Here we use the term "anchor carrier" for cells in a coverage layer frequency band. The term "booster carrier" is used to denote cells on a different frequency band that are deployed for adding additional capacity to the network. Hence, if a booster carrier is deactivated, we know that the network still has sufficient area coverage. In 3GPP the terminology primary cell. PCell. and secondary cell. SCell, may in some deployments correspond to cells on a coverage band (anchor carrier) and a capacity band (booster carrier), respectively.

TABLE 1

Recommendations for different RATs on when to enable MIMO sleep mode

| MIMO sleep mode | LTE | NR | NB-IoT |
|---|---|---|---|
| Sleep mode 1 (no additional latency) | Always | Never | Always |
| Sleep mode 2 (1-10 ms additional latency) | Always | Always when there is no cMTC traffic With caution in case of cMTC traffic | Always |
| Sleep mode 4 (seconds to minutes of latency) | Never on an anchor carrier. With caution on booster carriers. | Never on an anchor carrier. With caution on booster carriers. | Never on an anchor carrier. With caution on booster carriers. |

Figure 6:
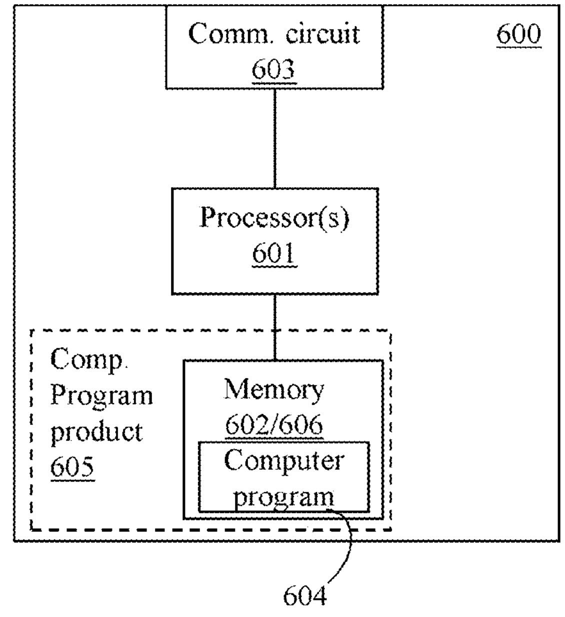
FIG. 6 is a block diagram depicting a device according to embodiments.

FIG. 6 is a block diagram illustrating one embodiment of a device 600, comprising a processor 601, a computer program product 605 in the form of a computer readable storage medium 606 in the form of a memory 602 and communication circuitry 603.

The memory, 602, contains instructions executable by the processor, 601, such that the device 600, in one embodiment is operative to determine 301, 303, 305 sleep mode independently for the at least two RATs and perform 309, 307, 311 a port merging operation for at least one of the at least two RATs based on the determined sleep modes.

In a preferred embodiment, the memory, 602, contains instructions executable by the processor, 601, such that the device 600 is operative to determine 303 a first sleep mode for a first RAT; optionally, to determine 305 a second sleep mode for a second RAT. In this embodiment the two RATs may be in two different sleep modes. The device 600 may be operative to merge 309 two or more antenna ports of the first RAT based on the determined first sleep mode; optionally, to merge 309 two or more antenna ports of the second RAT based on the determined second sleep mode.

In a preferred embodiment, the device 600 may be operative to merge 313 the first RAT merged antenna ports with ports of the other of said at least two RATs, wherein the ports of the other of said at least two RATs have not been merged.

In an alternative embodiment, the first RAT merged antenna ports may be merged with the second RAT merged antenna ports.

Further, the device 600 may be operative to put one or more components in one or more transmitter chains supporting the merged antenna ports in a power saving state, 315, wherein a transmitter chain comprises components used for transmitting a signal.

Preferably, the device 600 is further operative to perform a handover or cell reselection of UEs from a RAT with lower energy efficiency to a RAT with higher energy efficiency before merging two or more antenna ports of the RAT with lower energy efficiency, 317.

The device, 600, is further operative to perform the operations of the method described in the embodiments disclosed earlier.

The device, 600, may be a baseband unit or a radio unit. In case of Centralized Unit, CU, Distributed Unit, DU, Split architecture, the control of the port merging function may be in the CU. The actual port merging operation may be performed in either the DU or the CU. Different products might have different functional splits. In embodiments, where antenna and radio unit are integrated the device, 600, may be part of the integrated device.

The device, 600, may and may include a processing circuitry (one or more than one processor), 601, coupled to communication circuitry, 603, and to the memory 602. The device, 600, may comprise more than one communication circuitry. For simplicity and brevity only one communication circuitry, 603, has been illustrated in FIG. 6. By way of example, the communication circuitry, 603, the processor(s) 601, and the memory 602 may be connected in series as illustrated in FIG. 6. Alternatively, these components 603, 601 and 602 may be coupled to an internal bus system of the device, 600.

The memory 602 may include a Read-Only-Memory, ROM, e.g., a flash ROM, a Random Access Memory, RAM, e.g., a Dynamic RAM, DRAM, or Static RAM, SRAM, a mass storage, e.g., a hard disk or solid state disk, or the like.

The computer program product 605 comprises a computer program 605, which comprises computer program code loadable into the processor 601, wherein the computer program 604 comprises code adapted to cause the device 600 to perform the steps of the method described herein, when the computer program code is executed by the processor 601. In other words, the computer program 604 may be a software hosted by the device 600.

It is to be understood that the structures as illustrated in FIG. 6 are merely schematic and that the device, 600, may actually include further components which, for the sake of clarity, have not been illustrated, e.g., further interfaces or processors. Also, it is to be understood that the memory, 602, may include further program code for implementing other and/or known functionalities.

It is also to be understood that the device, 600, may be provided as a virtual apparatus. In one embodiment, the device, 600, may be provided in distributed resources, such as in cloud resources. When provided as virtual apparatus, it will be appreciated that the memory, 602, processing circuitry, 601, and communication circuitry, 603, may be provided as functional elements. The functional elements may be distributed in a logical network and not necessarily be directly physically connected. It is also to be understood that the device, 600, may be provided as a single-node device, or as a multi-node system.

Figure 7:
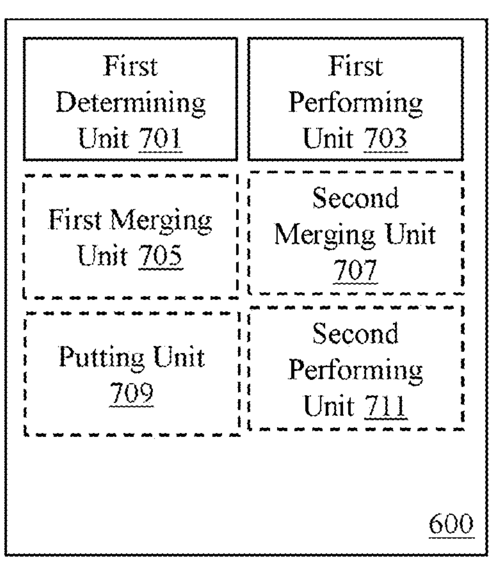
FIG. 7 is a block diagram depicting units of a device according to embodiments.

FIG. 7 schematically illustrates, in terms of several functional units, the components of a device 600 according to an embodiment. The device 600 comprises a first determining unit 701 configured to determine 301, 303, 305 sleep mode independently for the at least two RATs; a first performing unit configured to perform 309, 307, 311 port merging for at least one of the two RATs based on the determined sleep modes.

Then the device 600 illustrated in FIG. 7 may optionally further comprise: a first merging unit 705 configured to merge 309, 311 two or more antenna ports of a first RAT based on a determined first sleep mode; a second merging unit 707 configured to merge 313 the first RAT merged antenna ports with ports of the other of said at least two RATs; a putting unit 709 configured to put 315 one or more components in one or more transmitter chains supporting the merged antenna ports in a power saving state; a second performing unit 711 configured to perform **317*a*** handover or cell reselection of UEs from a RAT with lower energy efficiency to a RAT with higher energy efficiency before merging two or more antenna ports of the RAT with lower energy efficiency.

The invention claimed is:

1. A method for reducing energy consumption for a base station providing multiple-input multiple-output, MIMO, communication on a mixed-mode carrier supporting at least two radio access technologies, RATs, wherein the method comprises:

determining sleep mode independently for the at least two RATs;

performing port merging for at least one of the two RATs based on the determined sleep modes.

2. The method according to claim 1, the method comprising:

performing a handover or cell reselection of UEs from a RAT with lower energy efficiency to a RAT with higher energy efficiency before merging two or more antenna ports of the RAT with lower energy efficiency.

3. The method according to claim 1, wherein determining sleep mode is based on one or more of: user throughput, number of connected UEs, number of utilized physical resource blocks or RAT supported by UEs.

4. The method according to claim 1, wherein the RAT is a 3GPP RAT.

5. A device for reducing energy consumption for a base station providing multiple-input multiple-output, MIMO, communication on a mixed-mode carrier supporting at least two radio access technologies, RATs, the device comprising a processor and a memory, the memory having stored thereon instructions executable by the processor, wherein the instructions, when executed by the processor, cause the device to:

determine sleep mode independently for the at least two RATs;

perform port merging for at least one of the two RATs based on the determined sleep modes.

6. The device according to claim 5, wherein the instructions, when executed by the processor, cause the device to:

merge two or more antenna ports of the first RAT based on the determined first sleep mode;

merge the first RAT merged antenna ports with ports of the other of said at least two RATs;

put one or more components in one or more transmitter chains supporting the merged antenna ports in a power saving state.

7. The device according to claim 6, wherein at least one port of the other of said at least two RATs is merged.

8. The device according to claim 5, wherein the instructions, when executed by the processor, cause the device to:

perform a handover or cell reselection of UEs from a RAT with lower energy efficiency to a RAT with higher energy efficiency before merging two or more antenna ports of the RAT with lower energy efficiency.

9. The device according to claim 5, wherein the instructions, when executed by the processor, cause the device to determine sleep mode based on one or more of: user throughput, number of connected UEs, number of utilized physical resource blocks or RAT supported by UEs.

10. The device according to claim 5, wherein the RAT is a 3GPP RAT.

11. The device according to claim 10, wherein the first RAT is 3GPP LTE and the second RAT is 3GPP NR.

12. The device according to claim 10, wherein the first RAT is 3GPP LTE and the second RAT is 3GPP NB-IoT.

13. The device according to claim 10, wherein the first RAT is 3GPP NR and the second RAT is 3GPP NB-IoT.

14. The device according to claim 5, wherein the merging is an antenna mapping matrix operation.

15. The device according to claim 14, wherein the antenna mapping matrix operation indicates two or more signals of antenna ports to add and one or more antenna branches to deactivate.

16. The device according to claim 5, wherein the operation of merging is performed in a baseband unit.

17. The device according to claim 5, wherein putting one or more components in one or more transmit paths supporting the merged antenna ports in a power saving state and adding signals of antenna ports is performed in an antenna unit.

18. The device according to claim 5, wherein the instructions, when executed by the processor, cause the device to:

monitor resource utilization of a RAT;

activate a sleep mode for the RAT if a metric based on the resource utilization of the RAT is a value below a first threshold;

deactivate the sleep mode for the RAT if the metric based on the resource utilization of the RAT is a value above a second threshold.

19. A method for reducing energy consumption for a base station providing multiple-input multiple-output, MIMO, communication on a mixed-mode carrier supporting at least two radio access technologies, RATs, wherein the method comprises:

determining sleep mode independently for the at least two RATs;

performing port merging for at least one of the two RATs based on the determined sleep modes;

merging two or more antenna ports of the first RAT based on the determined first sleep mode;

merging the first RAT merged antenna ports with ports of other of said at least two RATs;

putting one or more components in one or more transmitter chains supporting the merged antenna ports in a power saving state.

20. The method according to claim 19, wherein at least one port of the other of said at least two RATs is merged.

* * * * *